INVENTOR
THOMAS R. HERRMANN
BY
Lothrop & West
ATTORNEYS

Jan. 20, 1970      T. R. HERRMANN      3,490,575
MACHINE AND METHOD FOR HANDLING ARTICLES
Filed June 26, 1967      5 Sheets-Sheet 4
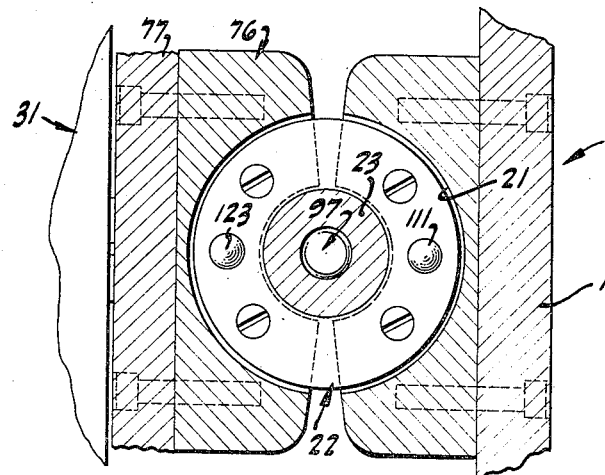
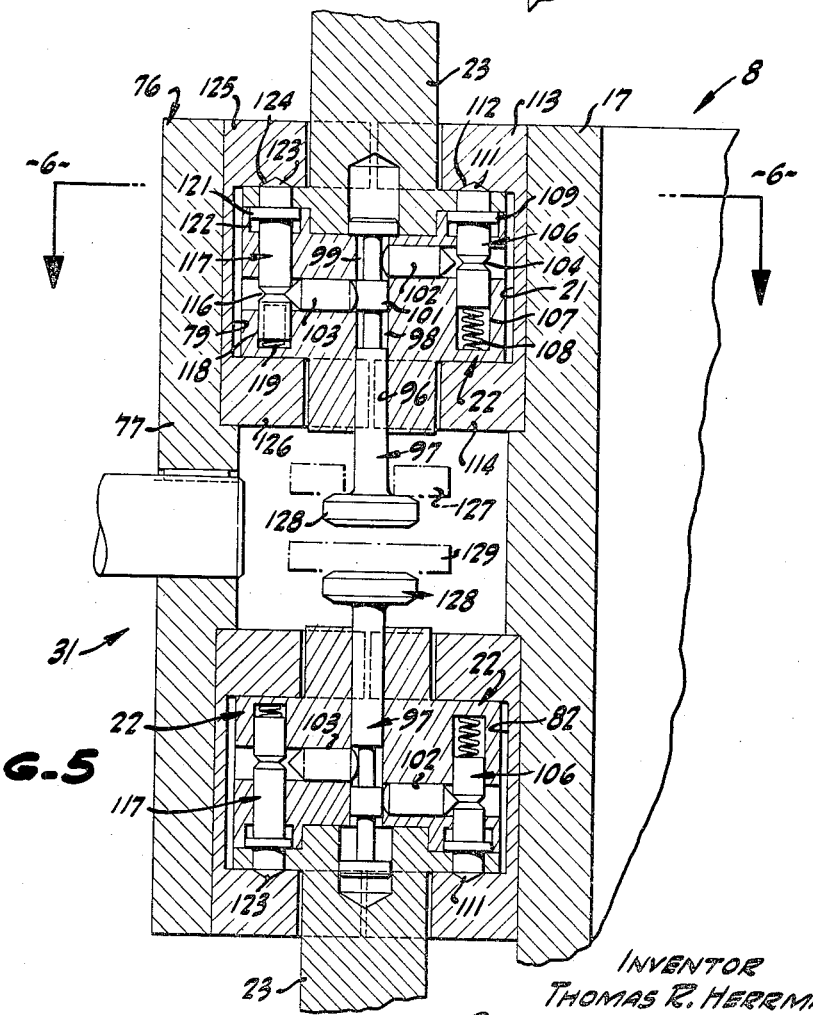
INVENTOR
THOMAS R. HERRMANN
BY
Lothrop & West
ATTORNEYS Jan. 20, 1970  T. R. HERRMANN  3,490,575
MACHINE AND METHOD FOR HANDLING ARTICLES
Filed June 26, 1967  5 Sheets-Sheet 5
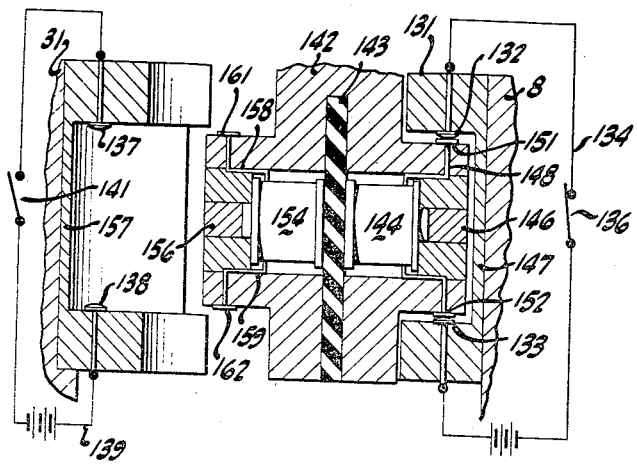
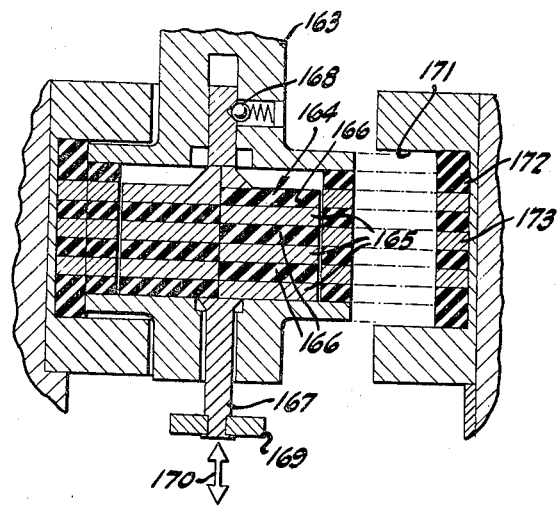
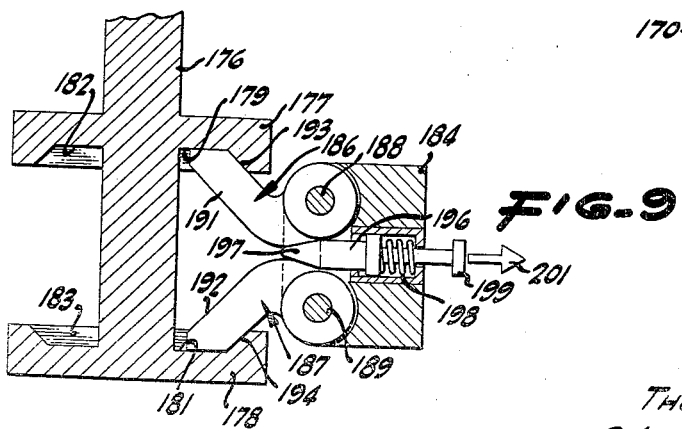
INVENTOR
THOMAS R. HERRMANN
BY Lothrop & West
ATTORNEYS United States Patent Office 3,490,575
Patented Jan. 20, 1970

3,490,575
MACHINE AND METHOD FOR HANDLING ARTICLES
Thomas R. Herrmann, Pacific Grove, Calif., assignor to The Tensor Corporation, a corporation of California
Filed June 26, 1967, Ser. No. 648,702
Int. Cl. B65g 47/24
U.S. Cl. 198—33                                     12 Claims

ABSTRACT OF THE DISCLOSURE

A turntable has sockets on its periphery effective to hold batons with one point thereon always facing center. The sockets are arranged on the turntable at two elevations. A second turntable tangent to the first turntable has means for receiving a baton from one elevation on the first turntable at the point of tangency thereof, inverting the baton and returning the inverted baton to the first turntable at the point of tangency and at the other elevation.

My invention relates generally to means for handling articles through a predetermined progression of locations preferably in a closed path and is especially concerned with a transport means of a standard or uniform character serving as carrying elements for many different attached articles. The transport or carrying elements, called batons, are moved in several paths tangent at some point, at which point a transfer of batons from one path to another path takes place. The batons preferably move in a closed path of any of several different configurations so that they recycle.

In many industrial operations there are various articles or packages, differing from time to time, which must be moved through successive stages of a manufacturing procedure. It is beneficial to attach these sundry, different articles to a common form of carrier and to move the articles so attached through a sequence so that various steps of manufacture can be accomplished at successive stations and so that the carriers are restored to the starting point for reuse. Conveyor chains and other flexible bands are used as carriers but it is difficult with them to arrange for accurate location of the carriers or articles at the several operating stations, it is difficult to arrange for high speed operation, and it is difficult efficiently to employ the numerous carriers available.

It is therefore an object of my invention to provide a machine for handling any one of a number of different kinds of articles with the same carrier through any one of a number of different manufacturing paths from station to station and for eventually restoring the carrier to its original location without the use of chains or comparable mechanisms.

Another object of the invention is to provide a method and means for performing any of several series of processing steps by use of a common carrier or baton so that any of a number of different kinds of articles can be readily processed.

Another object of the invention is to provide for an easy and accurate return of the carrier or baton to its original location and to provide a great deal of flexibility or adaptability in carrying out the method.

Another object of the invention is to provide automatic means for shifting a carrier or baton from one carrying instrumentality to another at relatively high speed and with certainty.

Another object of the invention is to provide a handling machine in which the various carrying devices are utilized efficiently and without substantial idle time.

Another object of the invention is to provide a machine in which the carriers are accurately located at the various operational stations.

Another object of the invention is to provide a machine in which the accelerations are such that high speeds of operation are feasible without great wear and with smooth functioning.

Another object of the invention is to provide a machine involving the positioning of carriers in such a way that there is always a predetermined facing of the carriers with respect to the machine.

Another object of the invention is to provide an improved machine and method for handling various articles.

Other objects of the invention together with the foregoing are attained in the embodiments of the invention described in the accompanying description and illustrated in the accompanying drawings, in which:

FIGURE 5 is a cross section, the plane of which is indicated by the line 5—5 of FIGURE 3;

FIGURE 6 is a cross section, the plane of which is indicated by the line 6—6 of FIGURE 5;

FIGURE 7 is a view somewhat similar to a portion of FIGURE 5 and showing in cross section and also diagrammatically a variant form of baton or carrier holding and releasing means;

FIGURE 8 is a view comparable to FIGURE 7 and showing a modified form of baton holding and releasing means; and FIGURE 9 is a diagram showing a portion of a further modified form of baton holding and releasing means.

Figure 1:
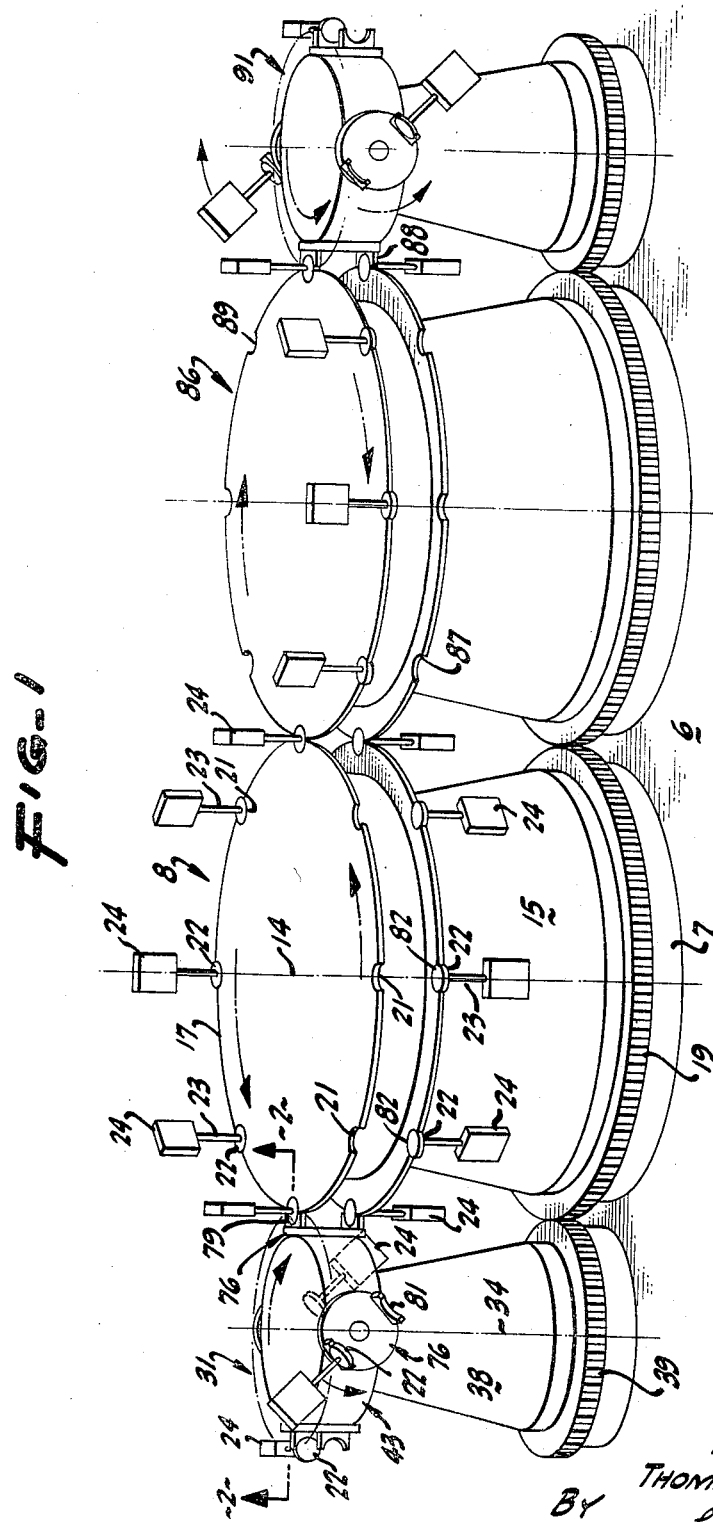
FIGURE 1 is a perspective view, somewhat diagrammatic, of one form of machine for handling articles pursuant to the invention, certain portions of the mechanism being omitted for clarity of disclosure and some of the article handling mechanisms likewise being not shown.
Figure 2:
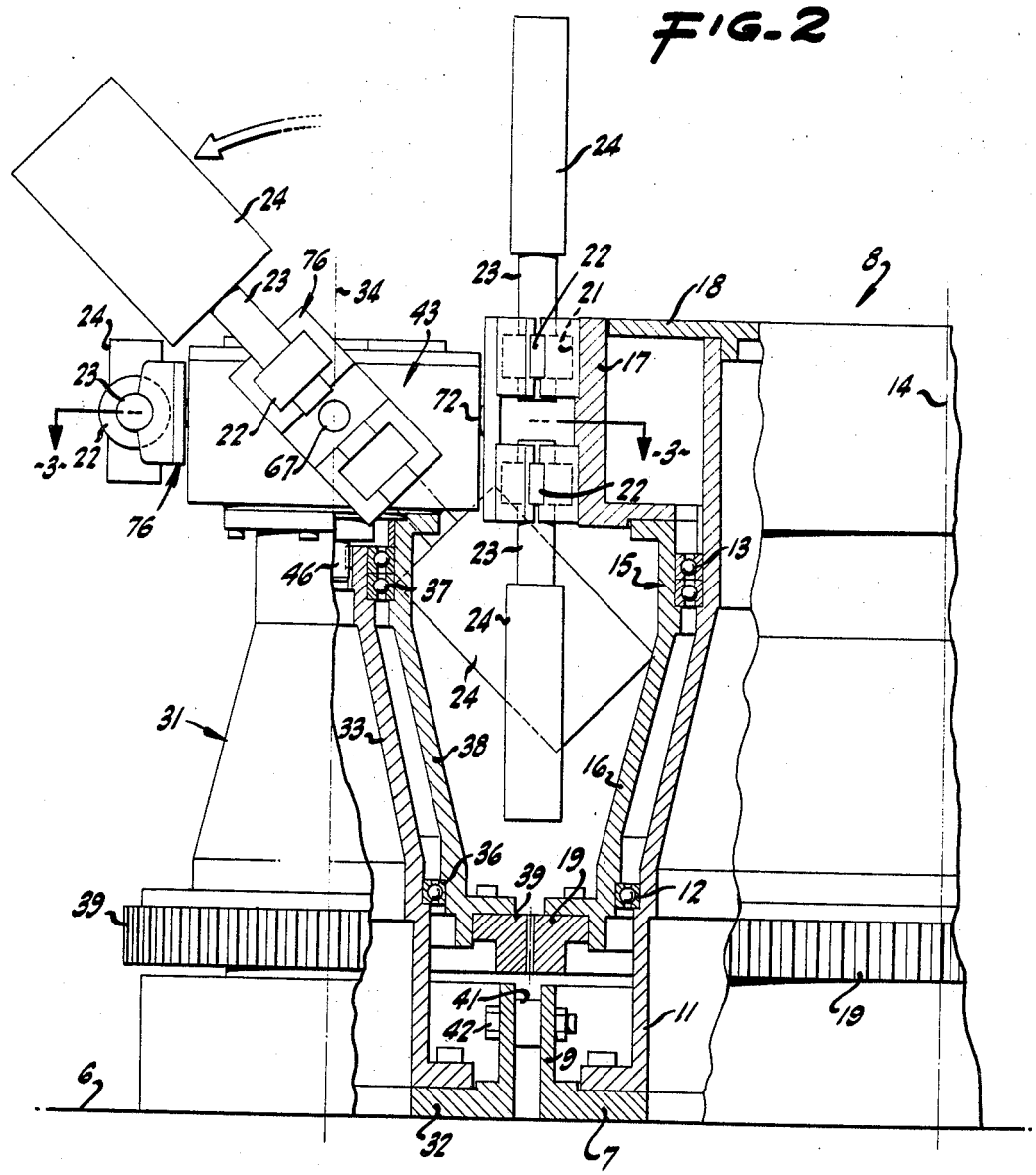
FIGURE 2 is a side elevation with portions being broken away of a portion of the mechanism generally indicated by the lines 2—2 of FIGURE 1.

While the machine and method of the invention can be embodied and carried out in widely variant forms, it has with considerable success been carried out in the form primarily illustrated in FIGURE 1. In this typical or exemplary arrangement, the installation is made in a factory room having a floor 6 on which the base 7 of a first turntable 8 is mounted. The base 7 need not always be bolted down since it is relatively massive and tends to remain as positioned. The base 7 includes not only an outer rim 9 (FIGURE 2), but likewise a central upstanding tubular pedestal 11 tapering toward the top and carrying a lower bearing 12 and an upper bearing 13. Surrounding the pedestal 11 and mounted for rotation on the bearings 12 and 13 about a central axis 14 is a turntable rotor 15. The rotor includes a skirt 16 engaging the bearings 12 and 13 and also includes an upper table rim 17 of annular or circular configuration concentric with the axis 14. A stationary plate 18 on the pedestal serves as a closure. Situated around the lower end of the skirt 16 is a gear 19 which can be connected to any desired kind of driver (not shown) so that when desired the turntable rotor 15 is readily revolved.

Around its periphery at appropriate intervals, usually evenly spaced, the turntable rim 17 is provided with a number of sockets 21. Each of the sockets preferably includes a semicircular cylindrical or prismatic indentation arranged so that the axis of the socket 21 is parallel to the axis 14.

Designed to be received in the semicircular socket 21 is a circular cylindrical boss 22, of slightly smaller diameter, carrying a stem 23 on which a mandrel 24 or other comparable terminus may be mounted. The boss 22 and the stem 23, at least, are referred to as a "baton," but this term is not intended to be limited to a structure of this precise sort. The point is that the baton and the socket releasably interengage with each other. By the same understanding the socket itself need not be semicylindrical or prismatic since the interengagement of the socket and the baton can be arranged in any appropriate fashion.

When the turntable rim 17 revolves with the gear 19, the baton 23 is advanced from any given point to another point farther around the periphery of the turntable. Since means are provided, later described, for holding the baton in the socket without rotation about its own axis, there is always one point on the baton which faces center or faces the axis 14. This is shown by the various batons in FIGURE 1.

With this arrangement, articles which are on or are carried by the baton or are on the mandrel 24 are advanced from station to station. The advancement can be intermittently but preferably is continuously at high speed so that various operations can be performed as the batons pass through individual stations.

Alongside of the turntable 8 there is similarly situated another turntable generally designated 31. This includes a base 32 mounted on the floor 6 and having an upstanding central pedestal 33 symmetrical about a central axis 34 parallel to the axis 14. Situated on the pedestal is a lower bearing 36 and an upper bearing 37 together carrying an outer turntable sleeve 38. A pinion gear 39 is fastened to the outer member 38 and meshes with the gear 19. In the event the two bases 7 and 32 are not both fastened to the floor, they can be connected together by a spacer 41 and a fastener 42 so that the gears 19 and 39 are held in appropriate mesh with the skirt 16 and the sleeve 38 rotating simultaneously although in opposite directions.

At its upper end the member 38 carries a turntable rim 43 which while approximately at the elevation of the turntable 8 is materially different in that it encloses a chamber 44 incorporating a mechanism for rotating and inverting the various batons.

Figure 3:
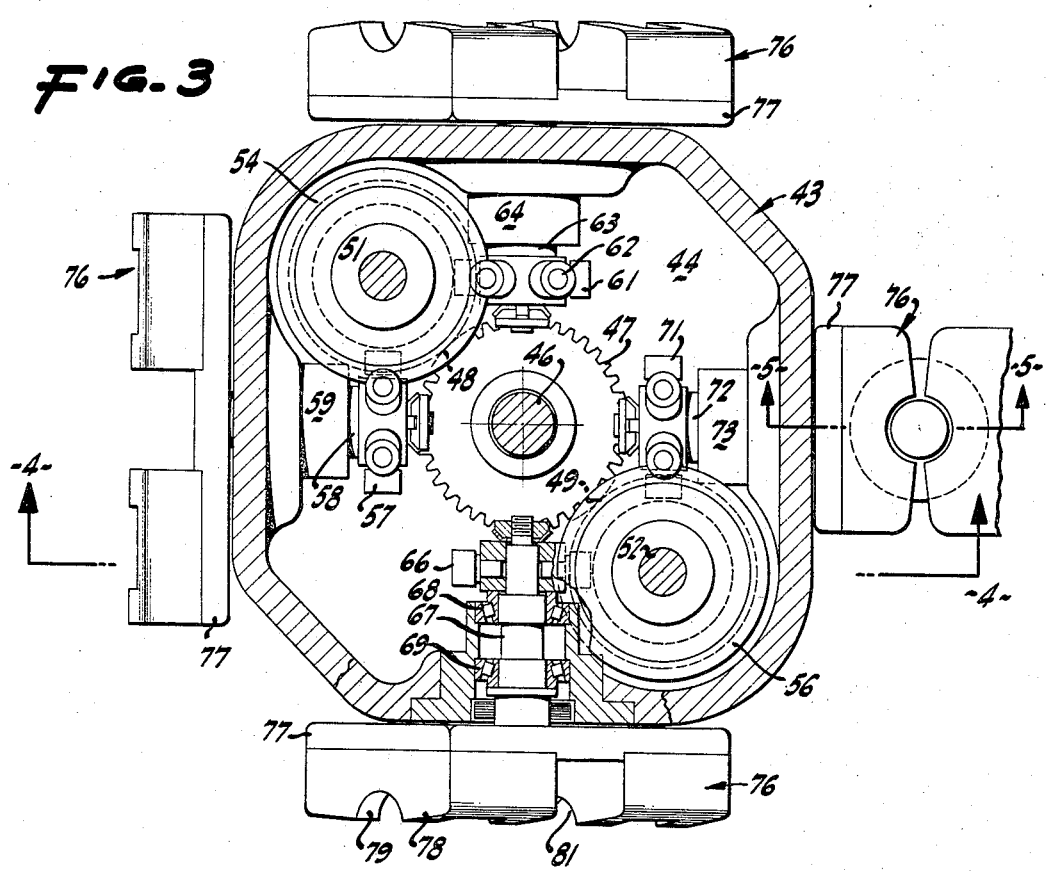
FIGURE 3 is a cross section, the plane of which is indicated by the line 3—3 of FIGURE 2.
Figure 4:
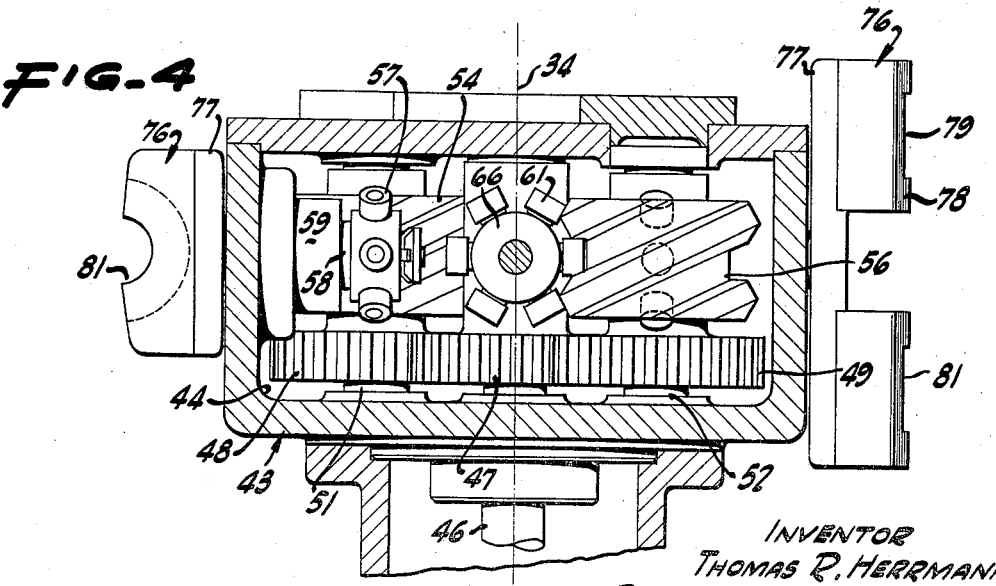
FIGURE 4 is a cross section, the plane of which is indicated by the line 4—4 of FIGURE 3.

Situated centrally within the pedestal 33 is a stationary shaft 46 (FIGURES 3 and 4) on which a central pinion 47 is secured. The pinion meshes with a pair of side pinions 48 and 49 respectively, each of which is on a respective one of two shafts 51 and 52. The shafts carry special gears 54 and 56. Meshing with the special gear 54 are roller pinions 57 on a shaft 58 journalled in the rim 43 by means of a bearing 59. Also, roller pinions 61 on a shaft 62 mesh with the gear 54 and are mounted on a shaft 63 carried by a bearing 64 in the housing rim.

In a comparable fashion, meshing with the special gear 56 is a roller tooth pinion 66 on a shaft 67 carried by bearings 68 and 69 mounted in the housing rim. A comparable roller tooth gear 71 drives a shaft 72 carried in a bearing casing 73 forming part of the housing rim. At the outer ends of each of the shafts 58, 63, 67 and 72 there are mounted rotors 76, all of which are identical, so that a description of one applies equally to the others. Each of the rotors includes a base plate 77 at one end carrying a block 78 in which a socket 79 of semicircular cylindrical contour is formed. Adjacent its other end the rotor plate 77 has a similar block with a semicircular socket 81. The socket 79, for example, is complementary to the socket 21.

As the turntable rim 43 is revolved, the various gear interconnections with the stationary pinion 47 cause a similar rotation of the various rotors as they travel around the periphery of the second turntable 31. The gear ratio is such that each of the rotors in traveling completely around the axis 34 makes a half turn about the axis of its own shaft. Stated differently, a socket which is uppermost when the second turntable is at the point of tangency with the first turntable, after travelling around the axis 34, returns to the point of tangency in an inverted and lower position. While the "point of tangency" is referred to, this is not used solely in its strict geometric sense as the first and second turntables need not actually touch each other, although they do have a point of closest mutual approach. Thus, a baton which is at the point of tangency or closest approach and is permitted to leave the counterclockwise revolving turntable 8 engages a particular socket 79, for example, then in momentary registry with the respective one of the sockets 21 on the turntable 8. The baton is transferred from the socket 21 to the socket 79 and makes a complete circuit around the clockwise revolving second turntable, being inverted or turning a half turn about the horizontal socket axis in the process. The radially inner side of the baton always faces radially inwardly. When the same, inverted baton returns to a similar point of tangency but at a lower elevation with respect to the turntable 8, the baton is then in confrontation with a similar socket 82 which is in vertical alignment or registry with one of the first sockets 21. The socket 82 is one of a series of similar sockets at a lower elevation on the first turntable and in vertical alignment with the sockets 21.

With appropriate transferring mechanism, the baton which leaves the upper elevation on the first turntable 8 is transferred to the second turntable 31, is inverted and is then restored to the first turntable 8 at a lower elevation. The restored, inverted baton then continues its counterclockwise travel, as indicated by the arrows in FIGURE 1, and is retained on the first turntable 8 until such time as the original baton comes to the point of tangency or closest approach between the first turntable 8 and a third turntable 86. The construction of the third turntable 86 is like that of the first turntable 8. The turntables are in geared interconnection and are at substantially the same elevation on the floor 6. The sockets 87 at the lower elevation on the third turntable are timed to confront the lower elevation sockets 82 on the first turntable at the point of tangency or closest approach of the two tables. At such point, the baton is transferred from the first turntable 8 to the third turntable 86 and travels clockwise approximately for a half circle until the loaded socket is opposite to and is in registry with a similar socket 88 on a second inverting mechanism 91 identical with the first inverting mechanism or second turntable 31.

While in FIGURE 1 the various instrumentalities are shown in linear array, they are in practice arranged sometimes in zigzag formation and in other arrangements always with the gears 19 and 39 in mesh so that the adjacent members turn oppositely to each other but at the same peripheral speed and always with the various sockets in confrontation or registry at the particular points of tangency or closest approach.

The operation of the second inverting device 91 is exactly like that of the first since the original baton, which was inverted and lowered by the second turntable or inverting device 31, is received at the lower elevation and is again rotated through a half turn by the fourth turntable or second erecting device 91. The baton is erected to assume an upright position and at the upper elevation of the third turntable 86. The baton is transferred to and is then carried by an appropriate one of the upper elevation sockets 89 on the third turntable 86 and is carried back in a somewhat serpentine path to the point of beginning. Thus, a baton is carried around one side of the first turntable at one elevation, is then inverted and returned to the first turntable at a lower elevation, is carried around at the lower elevation to a lower elevation on a second turntable, is then inverted and restored to the first elevation on the third turntable, and finally is restored to the point of beginning. Thus there is a complete cycle throughout the range of the machine with all of the "going" batons, for example, proceeding at one elevation and all of the "returning" batons proceeding at a different elevation. The batons themselves can carry any type of article which can pass the clearances between the various parts of the assembly. Since each of the turntables, whether a two-level turntable such as the turntables 8 and 86 or an inverting turntable such as the turntables 31 and 91, can be arranged in any particular configuration so long as their gear mechanisms are in mesh and so long as the various sockets register with each other at the respective tangency points.

The transfer of a baton from one socket to a companion, facing and registering socket on an adjacent turntable can be arranged in any number of different ways. As illustrated in FIGURES 5 and 6, a preferred transfer device utilized in connection with the mechanism of FIGURES 1–4 includes in the baton boss 22 a central passage 96 in which a plunger 97 is movable in an axial direction. The plunger has a pair of grooves 98 and 99 separated by a land 101 and impinged upon by a pair of holding pins 102 and 103 arranged in cross bores in the boss 22. The plunger 102 has a conical end designed to enter into a matching V groove 104 around the periphery of a detent pin 106 reciprocable in an axial bore 107 in the boss 22. A spring 108 urges the detent upwardly until a collar 109 thereon abuts the enlarged upper end of the bore 107. In this position of the detent 106 a conical nose 111 on the detent interengages with a corresponding depression 112 in the under side of a socket flange 113 on the periphery of the rim of the turntable 8. A similar flange 114 underlies the bottom portion of the boss 22 and defines the bottom of the socket.

The other pin 103 has a conical end adapted to interengage with a matching V groove 116 in a detent pin 117 reciprocable in a bore 118 parallel to the bore 107. The pin 117 is urged upwardly by a spring 119 and has a collar 121 which serves as a stop in the uppermost position of the detent. In the restrained position of the detent, the collar occupies a lower position in its chamber 122. In unrestrained condition a nose 123 on the detent 117 can interengage with a depression 124 in a socket flange 125 on the rim of the adjacent turntable 31. The flange 125 is complemented by a flange 126 similar to the flange 114 and defines the bottom of the socket.

In the operation of this structure, as the baton boss 22 enters the socket between the flanges 113 and 114, the nose 111 cams into the depression 112 under the urgency of the spring 108, the pin 106 being free to slide. The plunger 97 is quickly moved from its lower position into an upper position. In so moving, the land 101 lifts into a position behind the pin 102, displacing the pin, so that the conical pin nose occupies the groove 104 and locks the pin 106 in position, thus anchoring the baton to the turntable 8. As the land 101 lifts, it leaves the pin 103 free. As the baton boss 22 is pulled from the socket on the turntable 31 because of the new connection to the turntable 8, the nose 123 is cammed out of the depression 124, since the pin 117 is now free to lower, compressing the spring 119 and displacing the unblocked pin 103 into the groove 98. The reverse operation occurs when the baton transfer is in the opposite direction.

The baton is thus disengaged from one of the turntables and effectively engaged with the other turntable. Whichever detent is in engagement at any one time with its adjacent socket or turntable prevents rotation of the baton about its own axis with respect to that socket or turntable. Thus, one point on the baton, or the article carried thereby, always faces the center of rotation of the particular turntable to which it happens at the moment to be secured. The transfer from one table to the other is quickly effected as the enlarged end 128 of the plunger 97 encounters a cam 127 appropriately timed for that purpose. The enlarged end 128 of an inverted plunger 97 operated by an appropriate cam 129 controls the engagement and release of the baton at the lower elevation of the tangent turntables. Preferably, the upright and the inverted plungers 97 are actuated simultaneously so that as one baton progresses from right to left, for example, in FIGURE 5, the other baton progresses from left to right in that figure.

As a modification of the baton holding and releasing mechanism of FIGURES 5 and 6, an electrical mechanism as shown in FIGURE 7 can be provided. In this instance, a socket 131 on the turntable 8 is modified to have a pair of electrical conductors 132 and 133 in a circuit 134 controlled by a switch 136. Similarly, the other turntable 31 carries comparable contacts 137 and 138 themselves in a circuit 139 controlled by a switch 141. The stem of a baton 142 has a central insulating barrier 143 and on one side has an electromagnetic coil 144 arranged with a pole piece 146 adjacent the magnetic material 147 of the socket 131. Leads 148 and 149 from the electromagnet 144 extend to contacts 151 and 152.

In a similar fashion, on the other side of the barrier 143 a second electromagnet 154 having a pole piece 156 is adapted to cooperate with the magnetic material 157 of the socket on the turntable 31. The electromagnet has leads 158 and 159 which extend to contacts 161 and 162 respectively.

As shown in FIGURE 7, the turntables, although adjacent, are not quite at the point of tangency or closest approach. The baton 142 is still held in the turntable 8 since the switch 136 is closed and the contacts 151 and 152 are in abutment with the contacts 132 and 133. The magnet 144 is energized and the pole piece 146 is held close to the material 147, thus retaining the baton not only against gravity and against radial dislodgment, but also against rotation about its own axis.

When the adjacent turntables come to or close to their point of tangency, at which time the baton 142 also occupies the socket on the turntable 31 as well as the socket on the turntable 8, the contacts 161 and 162 engage with the contacts 137 and 138. Thus, all of the electrical contacts are in physical abutment at the same time. The switch 136 is opened almost simultaneously with the closure of the switch 141. This action removes the magnetic hold of the baton on the turntable 8 and simultaneously establishes a magnetic hold of the baton on the turntable 31. In this fashion the grip of the baton is almost instantly transferred from one turntable to the other. The baton always is prevented from rotating about its own axis and always maintains at least one point toward the center of the particular turntable to which it is fastened. The term "fastened" also refers to the electromagnetic interrelationship of the relatively movable parts.

In FIGURE 8 is shown another variation of the magnetic interconnection of the parts. In this instance a baton 163 carries a movable laminated core 164 made up of alternating semicircular layers of permanently magnetized material 165 and inert material 166. These layers are staggered with respect to each other and are on a movable stem 167 retained in either extreme position by a spring-actuated detent 168 and are forcibly moved between extreme positions by an actuator (not shown) which engages a disk 169 on the stem 167. The stem movement is indicated by the arrow 170.

Included in the baton shell around the core are alternating, annular layers of magnetic and inert materials. In a socket 171 on the turntable 8 there is likewise supplied a series 172 of layers of magnetic material alternated with inert layers. These layers generally are at the same elevation or level as the layers or alternations in the baton shell. Comparably, the recess on the table 31 has a number of alternating layers 173 of magnetic and inert material, these also being arranged at the same level or elevation as the comparable layers in the baton shell.

When the baton is in both sockets at the point of tangency of the two tables and the shaft 167 is moved axially, it moves from one position in which the flux field causes the baton to be held in the socket on the turntable 8 to another position in which the flux field is more effective in connection with the magnetic materials on the second turntable 31. There is thus afforded a quick transfer of fastening from one turntable to the other, but the baton, as always, is kept from rotating about its own axis.

A further variation on a holding and releasing means is shown in FIGURE 9. In this instance the baton 176 has an upper disk 177 and a lower disk 178. The upper and lower disks each have a pair of notches 179 and 181 of radial extent on one side and a similar pair of notches 182 and 183 on the other side, these notches likewise being of radial extent but not circular. On each of the turntables, although the mounting on only one turntable is shown, there is provided on the rim 184 a pair of levers 186 and 187, each mounted on one of a pair of shafts 188 and 189. The levers have arms 191 and 192 movable into and out of the respective notches 179 and 181. In those notches the levers not only maintain the baton in proper radial position but likewise preclude its rotation about its own axis.

The levers are also in effect cams resting against an inclined side 193 of the notch 179 and a similar inclined side 194 on the notch 181. A force tending to dislodge the baton laterally from engagement with the levers 186 and 187 is resisted by a detent pin 196 having a conical end 197 resting between the levers. The pin 196 is urged by a spring 198 in one direction but has a disk 199 which can be externally operated in the direction of the arrow 201 to withdraw the detent pin 196 from between the levers. When this occurs, then a lateral dislodging force is effective to remove the baton from the levers.

Since a similar mechanism is provided on the tangent turntable, it is arranged so that the respective disks 199 on the two turntables are simultaneously actuated. Thus the levers on one turntable are released at the time the levers on the other turntable are locked in position. In this way the baton is stripped from a released holding means and is then gripped by the holding means quickly blocked thereafter.

The various forms of the arrangement described carry out the various steps of a method of advancing articles from a starting point through a closed circuit always with the articles facing a particular center, of advancing the articles to adjacent stations, of inverting the article carriers at appropriate points, and returning them in inverted condition to a point where they are again erected and restored to the point of beginning.

What is claimed is:

1. A machine for handling articles comprising a first turntable adapted to rotate in one direction about a first axis, a first socket at the perimeter of said first turntable, a second turntable having a point of tangency to said first turntable, a second socket at the perimeter of said second turntable, means for rotating said turntables with said first socket and said second socket in registry at said point of tangency, a circulating baton adapted to fit said sockets and having means thereon for holding an article to be processed, means interengaging said sockets and said baton for holding said baton in one of said sockets and for releasing said baton from the other of said sockets, and means for returning the released baton from said one of said sockets to said other of said sockets whereby said baton is cyclically recirculated in said machine to carry successive articles therethrough.

2. A machine as in claim 1 in which said second turntable includes means for inverting said circulating baton.

3. A machine as in claim 1 in which at least one of said turntables includes at least two sockets, one disposed at one elevation on said turntable and the other disposed at a different elevation on said turntable.

4. A machine as in claim 3 in which said interengaging means includes first means for holding and releasing said baton with respect to one of said sockets, second means for holding and releasing said baton with respect to the other of said sockets, and means for substantially simultaneously operating one of said holding means and the other of said releasing means.

5. A machine as in claim 1 in which said circulating baton substantially occupies both of said sockets when said sockets are in registry.

6. A machine as in claim 1 in which said sockets include means for preventing substantial rotation of said circulating baton with respect to said sockets.

7. A method for handling articles comprising moving an article in a first path corresponding to part of a first circle and at one elevation with one point on said article always directed toward the center of said first circle, then transferring said article to a second path tangent to said first path and corresponding to part of a second circle with one point on said transferred article always directed toward the center of said second circle, then moving said transferred article from said second path back to said first path and moving said article in a third path at a different elevation, said third path corresponding to part of a third circle with one point on said article always directed toward the center of said third circle.

8. A method as in claim 7 in which said first circle and said third circle are coaxial.

9. A method for handling articles comprising moving an article in one direction in one path corresponding to part of one circle at a predetermined elevation, then inverting said article, and then moving said inverted article in another direction in another path corresponding to part of another circle coaxial with said one circle and at a different elevation, and holding said article when moving in said paths always with one point of said article directed toward the axis of said circles.

10. A machine for handling articles comprising a base, a turntable, means for mounting said turntable for rotation on said base, a plurality of article holding and releasing means, means for mounting some of said holding and releasing means on said turntable adjacent the periphery thereof and at one elevation, means for mounting others of said holding and releasing means on said turntable adjacent the periphery thereof and at another elevation, and means for supplying articles to be held to said holding and releasing means.

11. A machine as in claim 10 including means for receiving an article from one of said holding and releasing means at one elevation, inverting said article and delivering said inverted article to another of said holding and releasing means at said other elevation.

12. A machine as in claim 10 including means for preventing rotation of said articles in said holding and releasing means.

References Cited

UNITED STATES PATENTS

| | | | |
|---|---|---|---|
| 1,958,846 | 5/1934 | Christensen | 214—1 X |
| 2,335,239 | 11/1943 | Gladfelter | 198—25 |
| 3,175,702 | 3/1965 | Banyas | 198—210 X |
| 3,158,251 | 11/1964 | Skala | 198—32 |

EDWARD A. SROKA, Primary Examiner

U.S. Cl. X.R.
198—210; 214—1